US009240214B2

(12) United States Patent
Hannuksela

(10) Patent No.: US 9,240,214 B2
(45) Date of Patent: Jan. 19, 2016

(54) MULTIPLEXED DATA SHARING

(75) Inventor: Miska Hannuksela, Ruutana (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 722 days.

(21) Appl. No.: 12/328,366

(22) Filed: Dec. 4, 2008

(65) Prior Publication Data
US 2010/0146055 A1 Jun. 10, 2010

(51) Int. Cl.
H04N 21/234 (2011.01)
G11B 27/034 (2006.01)
H04N 21/2343 (2011.01)
G11B 27/10 (2006.01)

(52) U.S. Cl.
CPC ............ *G11B 27/034* (2013.01); *G11B 27/105* (2013.01); *H04N 21/234* (2013.01); *H04N 21/2343* (2013.01); *H04N 21/23418* (2013.01)

(58) Field of Classification Search
None
See application file for complete search history.

(56) References Cited

U.S. PATENT DOCUMENTS

| 6,557,042 | B1* | 4/2003 | He et al. .................... 709/231 |
| 2002/0091840 | A1* | 7/2002 | Pulier et al. ................. 709/219 |
| 2002/0115454 | A1* | 8/2002 | Hardacker .................. 455/457 |
| 2003/0093797 | A1* | 5/2003 | Bazzaz ........................ 725/74 |
| 2005/0193421 | A1 | 9/2005 | Cragun |
| 2006/0104600 | A1* | 5/2006 | Abrams ........................ 386/46 |
| 2006/0187305 | A1* | 8/2006 | Trivedi et al. .............. 348/169 |
| 2007/0240190 | A1* | 10/2007 | Arseneau et al. ........... 725/81 |
| 2007/0279494 | A1* | 12/2007 | Aman et al. ................ 348/169 |
| 2008/0019661 | A1 | 1/2008 | Obrador et al. |
| 2008/0287059 | A1* | 11/2008 | Anderson et al. ........... 455/3.06 |
| 2008/0304808 | A1 | 12/2008 | Newell et al. |
| 2009/0063419 | A1* | 3/2009 | Nurminen et al. ............ 707/3 |
| 2009/0085740 | A1* | 4/2009 | Klein et al. ................. 340/540 |
| 2009/0087161 | A1 | 4/2009 | Roberts et al. |
| 2009/0089352 | A1* | 4/2009 | Davis et al. ................ 709/201 |
| 2009/0115843 | A1* | 5/2009 | Sohmers ..................... 348/61 |
| 2009/0193482 | A1* | 7/2009 | White et al. ................ 725/110 |

FOREIGN PATENT DOCUMENTS

JP 2003169297 A 6/2003
JP 2005167669 A 6/2005

OTHER PUBLICATIONS

Beet.TV, available at <http://web.archive.org/web/*/www.beet.tv> (Dec. 29, 2007).

(Continued)

Primary Examiner — Patrice Winder
(74) Attorney, Agent, or Firm — Ditthavong & Steiner, P.C.

(57) ABSTRACT

A computing device may receive multiple recordings or transmissions from one or more source devices. The recordings may include geo-tag information to relate the recordings to a specific event. The computing device may receive from a client device a request for the recordings. Responsive to the received request, the computing device may transmit the recordings to the client device. The computing device may receive from the client device an identification of which recording(s) are preferred over the course of the event, and may compile statistics related to the preferred selections over the course of the event as received from a plurality of client devices. The computing device may generate a "best-cut" recording or summary version of the event based on the most preferred recording at various points in time during the event, based on the compiled statistics.

18 Claims, 5 Drawing Sheets

(56) References Cited

OTHER PUBLICATIONS

InstantShareCam, available at <http://web.archive.org/web/*/http://www.instantsharecam.com> (Jan. 7, 2007).

Amazon.com, available at <http://web.archive.org/web/*/http://amazon.com> (Dec. 31, 2007).

International Search Report and Written Opinion of corresponding International Application No. PCT/FI2009/050825 dated Feb. 2, 2010, pp. 1-19.

* cited by examiner

MULTIPLEXED DATA SHARING

FIELD

Aspects of the invention generally relate to computer networking and information sharing. More specifically, aspects of the invention provide a computing device user an ability to select a desired perspective in relation to an event when multiple media sources of the event are available, wherein the user selection may facilitate a generation of a master or "director's cut" version of media of the event.

BACKGROUND

Improvements in computing technologies have changed the way people accomplish various tasks. For example, some estimates indicate that between the years 1996 and 2007, the fraction of the world's population that uses the Internet grew from approximately 1% to approximately 22%. Irrespective of the actual percentages, trends suggest that the Internet will continue to grow.

Along with the growth of the Internet, users and service providers have developed numerous applications and corresponding interfaces to facilitate the exchange of information. For example, a politician may give a "victory speech" after he has been announced as the winner of an election, and just as he is getting ready to deliver the speech, those in the audience, which may include the media/press and supporters of his campaign, may each use a digital video camera to shoot footage of the speech as it unfolds. The audience members that shot the video footage may each upload the video footage to a respective user account or the like associated with a commercial server thereafter for purposes of saving the video footage, freeing up memory on the digital video camera for future use, and allowing friends, family, or more generally, other computing users to view the video.

More generally, recent success of media sharing services has increased the amount of media content available on the Internet, yet the media content remains largely disorganized and characterized by low/poor quality. Users often waste time and become frustrated when they are forced to consume low quality media content and when they must review multiple versions of the same event to determine which recording is the best.

BRIEF SUMMARY

The following presents a simplified summary of example aspects of the invention in order to provide a basic understanding of some aspects of the invention. This summary is not an extensive overview, and is not intended to identify key or critical elements or to delineate the scope of the claims. The following summary merely presents some example concepts and aspects in a simplified form as a prelude to the more detailed description provided below.

To overcome limitations in the prior art described above, and to overcome other limitations that will be apparent upon reading and understanding the present specification, aspects of the present disclosure are directed to an apparatus, method and system for sharing informational content via one or more computing devices.

Various example aspects of the disclosure may, alone or in combination with each other, relate to receiving a first media stream and a second media stream, receiving one or more selections that choose between the first and the second media streams, and creating a summary stream based on the selection. Other various aspects may relate to generating and saving statistics related to the one or more selections that choose between the first and the second media streams.

These and other example aspects generally relate to providing access to a first media stream and a second media stream, where the first media stream and the second media stream are a similar media type. The first media stream and the second media stream may be associated with an event and may partially overlap in terms of a capture period. One or more users may be provided with an opportunity to switch or choose between the first media stream and the second media stream during a playback of the media. A "best-cut" version or a summary stream may be generated based on one or more user selections of the first and second media streams at determined playback times. In this manner, statistics regarding which portions of each media stream are most popular may be used as a basis to create the "best-cut" version of the media type for that event.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various example embodiments, reference is made to the accompanying drawings, which form a part hereof, and in which is shown by way of illustration various embodiments in which one or more example aspects of the invention may be practiced. It is to be understood that other embodiments may be utilized and structural and functional modifications may be made without departing from the scope of the present invention.

Streaming delivery refers to transmission of multimedia data in a stream of packets in real time, which allows simultaneous reception, decoding and playback of the multimedia data at a receiver of the stream. An unreliable transport protocol may be used in streaming delivery to achieve low end-to-end delay within a certain limit. Consequently, it might not be possible to reproduce the multimedia data perfectly at the receiver due to transmission errors.

Streaming is a collective term for streaming delivery and streaming applications. Streaming delivery may be used in applications beyond streaming, such as video telephone. Streaming applications may use half-duplex communications and may utilize initial buffering before the start of media rendering.

Progressive downloading refers to transmission of a multimedia file over a reliable communication protocol, such as Hypertext Transfer Protocol (HTTP), and decoding and rendering the file while it is being received. While progressive downloading guarantees perfect reproduction of the transmitted file, the receiver may have to halt the playback if the channel throughput falls below a data rate of the file. Progressive uploading refers to transmission of a multimedia file over a reliable communication protocol, such as Hypertext Transfer Protocol (HTTP), to a client device which may decode and render the file while it is being received.

Conventional information sharing services relate to a first user uploading or streaming media (e.g., a video file) to a server and a second user subsequently downloading or streaming the media for consumption (e.g., viewing). By way of introduction, and as demonstrated herein, example aspects of the invention may enhance the information sharing experience by providing multiple perspectives of an event in (substantially) real-time. A consuming user may select one or more perspectives, and may switch between the one or more perspectives. The selections may be made based on one or more location tags, camera angles, and/or timestamps corresponding to each perspective. Based on the selections, or one or more additional criteria, a summary media stream may be generated for the event. As used herein, an "event" refers to any recorded occurrence, and is not limited to specific planned gatherings, competitions, newsworthy items, or by any other criteria other than that an event is something that is capable of being recorded by audio and/or video.

Figure 1:
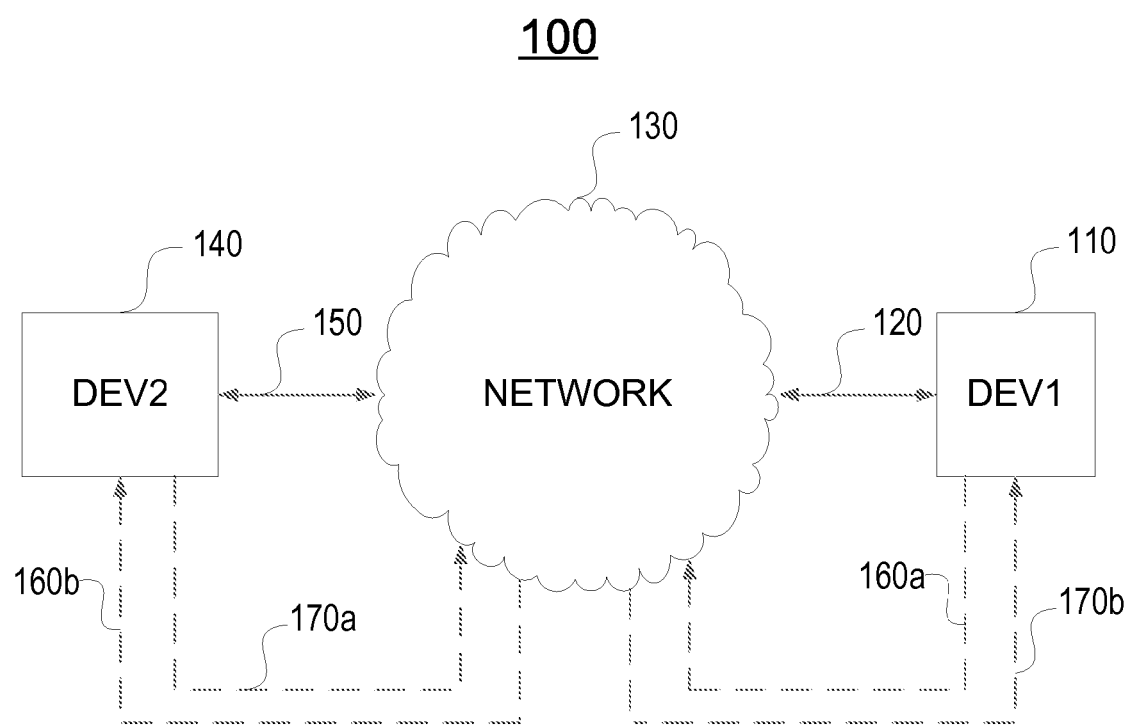
FIG. 1 illustrates a network computing environment suitable for carrying out one or more example aspects of the invention.

FIG. 1 shows an illustrative network computing environment 100 suitable for carrying out one or more aspects of the invention. FIG. 1 illustrates a first computing device DEV1 110 connected to a network 130 via a connection 120. Network 130 may include the Internet, an intranet, wired or wireless communication networks, or any other mechanism or media suitable for facilitating communication between computing platforms in general. FIG. 1 also depicts a second computing device DEV2 140, e.g., a computer, server, etc. connected to network 130 via a connection 150. By virtue of the connectivity as shown, DEV1 110 and DEV2 140 may communicate with one another. Such communications may enable the exchange of various types of information. For example, the communications may include data to be exchanged between DEV1 110 and DEV2 140. Such data may include media, images, audio, video, music, maps, games, programs, files, and/or the like. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, computing environment 100 may be structured to support separate forward and reverse channel connections (160a, 160b, 170a, 170b) to facilitate the communication. The definition of forward and reverse channels may depend, e.g., on the initiator of the communication, the viewpoint of the actor in the communication, and/or the primary direction of the data flows. For example, if DEV1 110 is streaming to DEV2 140, 160a and 160b may be regarded as the forward channels, while the reverse channels 170a and 170b carry, e.g., reception acknowledgement messages and retransmission requests.

Computing environment 100 may be carried out as part of a larger network consisting of more than two devices. For example, DEV2 140 may exchange communications with a plurality of other devices (not shown) in addition to DEV1 110. The communications may be conducted using one or more communication protocols. Furthermore, computing environment 100 may include one or more intermediary nodes (not shown) that may buffer, store, and/or route communications between the various devices.

Figure 2:
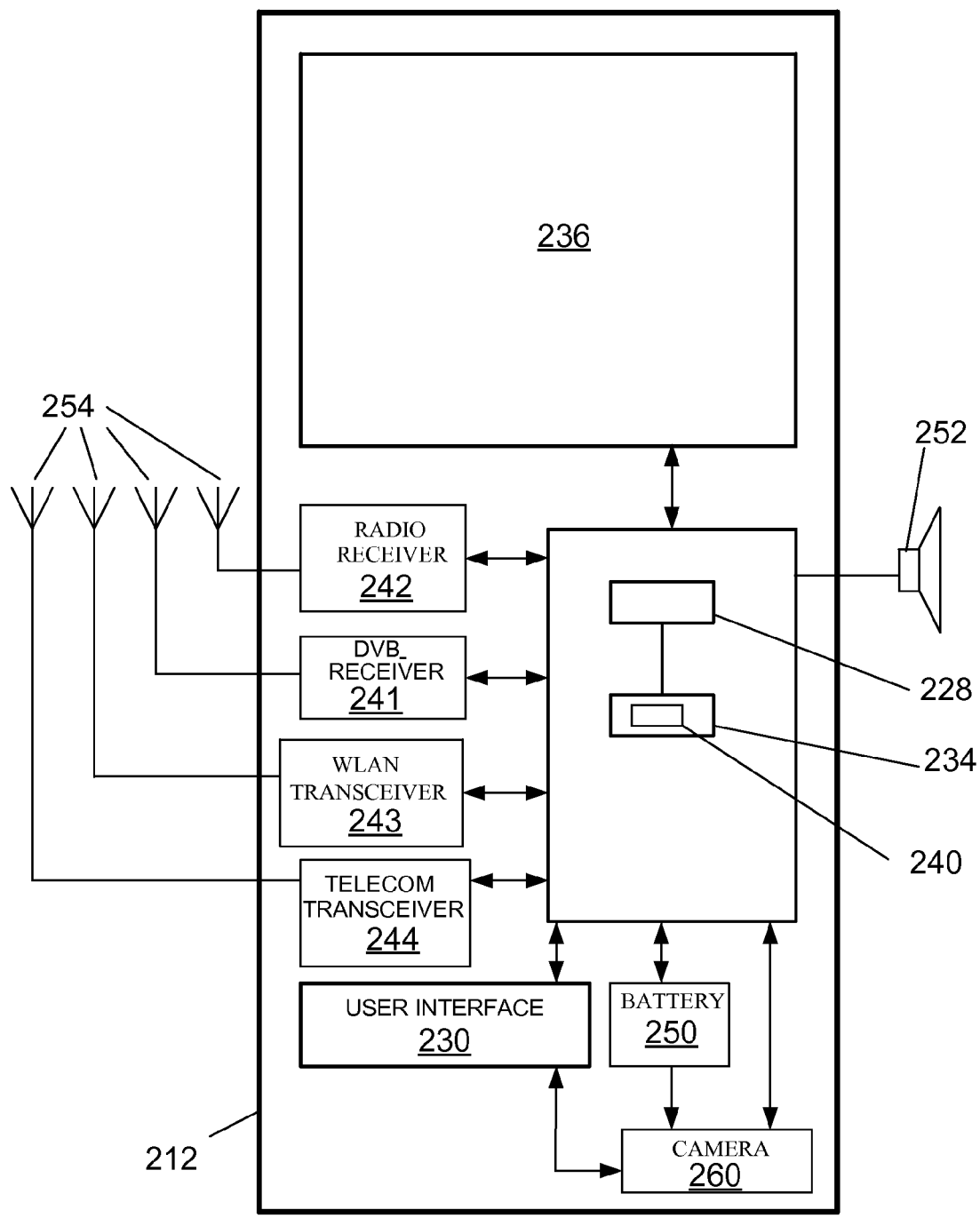
FIG. 2 illustrates a data processing architecture suitable for carrying out one or more example aspects of the invention.

FIG. 2 shows an illustrative computing device that may be used in accordance with one or more aspects of the invention. Device 212 (which may be equivalent to one or more of DEV1 110 and DEV2 140 of FIG. 1) may be any wireless or landline data processing device, e.g., a desktop computer, laptop computer, notebook computer, network server, portable computing device, personal digital assistant, smart phone, mobile telephone, cellular telephone, user terminal, distributed computing network device, mobile media device, digital camera/camcorder, audio/video player, positioning device, game device, television receiver, radio receiver, digital video recorder, any other device having the requisite components or abilities to operate as described herein, or any combination thereof. As shown in FIG. 2, device 212 may include processor 228 connected to user interface 230, memory 234 and/or other storage, and display 236. Device 212 may also include battery 250, speaker 252 and antennas 254. User interface 230 may further include a keypad/keyboard, touch screen, voice interface, arrow keys, joy-stick, stylus, data glove, mouse, roller ball, touch screen, and/or the like. In addition, user interface 230 may include the entirety of or portion of display 236, and display 236 may be touch sensitive.

Computer executable instructions and data used by processor 228 and other components within device 212 may be stored in a computer readable memory 234. The memory may be implemented with any combination of read only memory modules or random access memory modules, optionally including both volatile and nonvolatile memory. Software 240 may be stored within memory 234 and/or storage to provide instructions to processor 228 for enabling device 212 to perform various functions. Alternatively, some or all of the computer executable instructions may be embodied in hardware or firmware (not shown).

Furthermore, the computing device 212 may include additional hardware, software and/or firmware to support one or more aspects of the invention as described herein. Device 212 may be configured to receive, decode and process digital broadcast transmissions that are based, for example, on the Digital Video Broadcast (DVB) standard, such as DVB-H, DVB-T or DVB-MHP, MediaFLO, Digital Multimedia Broadcasting (DMB), through a specific receiver 241. Digital Audio Broadcasting/Digital Multimedia Broadcasting (DAB/DMB) may also be used to convey television, video, radio, and data. The mobile device may also include other types of receivers for digital broadband broadcast transmissions. Additionally, device 212 may also be configured to receive, decode and process transmissions through FM/AM Radio receiver 242, wireless local area network (WLAN) transceiver 243, and telecommunications transceiver 244. In at least one embodiment of the invention, device 212 may receive radio data stream (RDS) messages.

As shown in FIG. 2, device 212 may also include a camera 260. Camera 260 may include equipment for taking still photographs and pictures as well as equipment for capturing video, movie, or motion picture footage. Camera 260 may acquire power from battery 250 as shown, or in some embodiments may have its own separate power supply source. In some embodiments, camera 260 may be communicatively coupled to processor 228 and memory 234. Camera 260 may also be communicatively coupled to user interface 230 to receive inputs in the form of one or more commands or the like, and to generate outputs (e.g., pictures, video, etc.) in response to the inputs.

Device 212 may use computer program product implementations including a series of computer instructions fixed either on a tangible medium, such as a computer readable storage medium (e.g., a diskette, CD-ROM, ROM, DVD, fixed disk, etc.) or transmittable to computer device 212, via a modem or other interface device, such as a communications adapter connected to a network over a medium, which is either tangible (e.g., optical or analog communication lines) or implemented wirelessly (e.g., microwave, infrared, radio, or other transmission techniques). The series of computer instructions may embody all or part of the functionality with respect to the computer system, and can be written in a number of programming languages for use with many different computer architectures and/or operating systems. The computer instructions may be stored in any memory device (e.g., memory 234), such as a semiconductor, magnetic, optical, or other memory device, and may be transmitted using any communications technology, such as optical infrared, microwave, or other transmission technology. The computer instructions may be operative on data that may be stored on the same computer readable medium as the computer instructions, or the data may be stored on a different computer readable medium. Moreover, the data may take on any form of organization, such as a data structure. Such a computer program product may be distributed as a removable storage medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Various embodiments of the invention may also be implemented as hardware, firmware or any combination of software (e.g., a computer program product), hardware and firmware. Moreover, the functionality as depicted may be located on a single physical computing entity, or may be divided between multiple computing entities.

In at least one embodiment, device 212 may include a mobile client implemented in a C-based, Java-based, Python-based, Flash-based or any other programming language for the Nokia® S60/S40 platform, or in Linux for the Nokia® Internet Tablets, such as N800 and N810, and/or other implementations. Device 212 may communicate with one or more servers over Wi-Fi, GSM, 3G, or other types of wired and/or wireless connections. Mobile and non-mobile operating systems (OS) may be used, such as Windows Mobile®, Palm® OS, Windows Vista® and the like. Other mobile and non-mobile devices and/or operating systems may also be used.

Computing environment 100, DEV1 110, DEV2 140, and device 212 are merely illustrative forms for implementing one or more aspects of the description provided herein. Computing environment 100, DEV1 110, DEV2 140, and device 212 may be arranged or configured to support media sharing and generation as further described below. Media may be presented to a user in a specified sequence based on one or more filtering or selection algorithms as described below in relation to the computing environment of FIG. 3 and the method of FIG. 4, wherein the method selects a source of a desired version of an event and presents the desired version at one or more computing devices.

Figure 3:
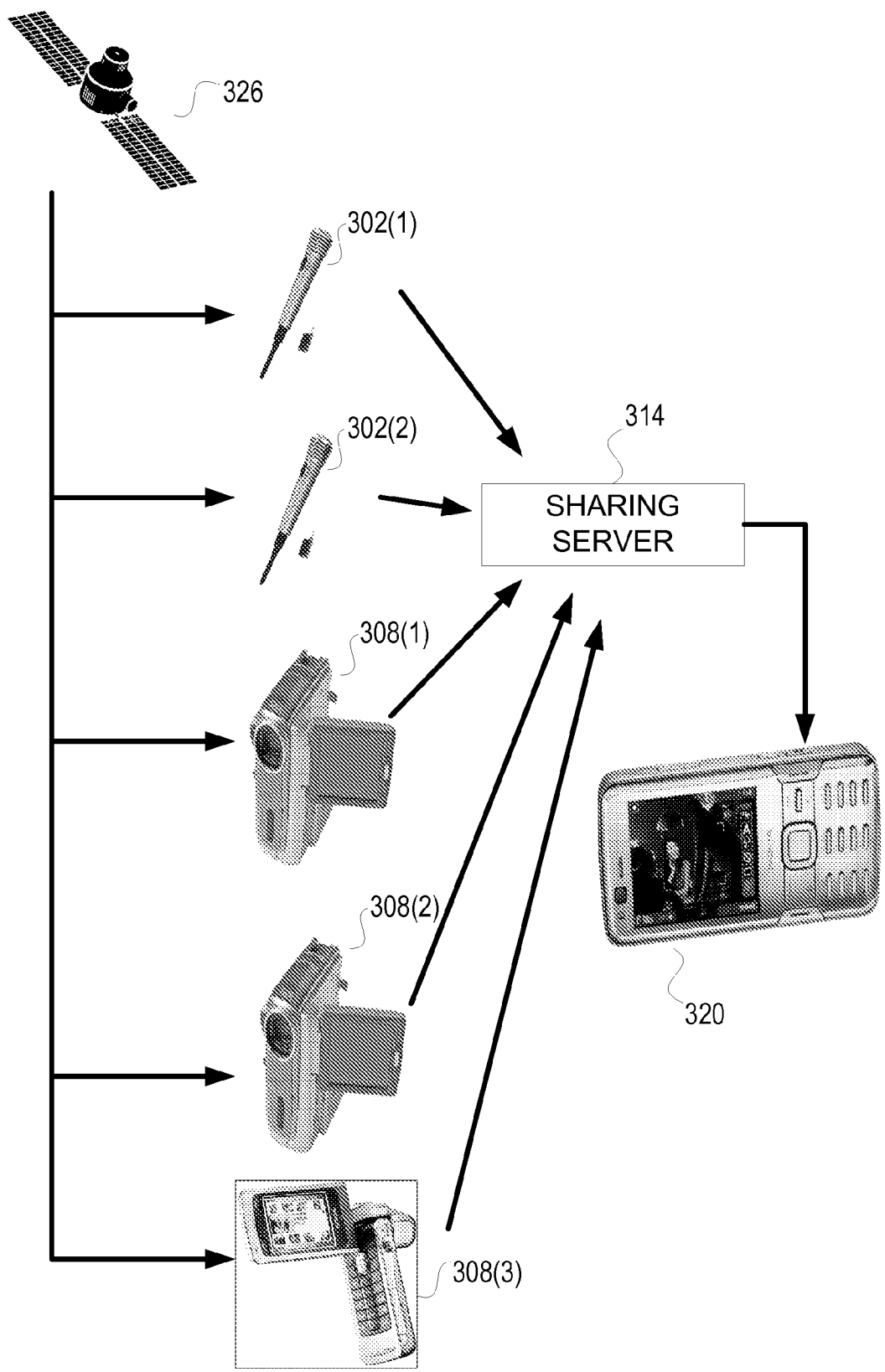
FIG. 3 illustrates a computing environment suitable for demonstrating one or more example aspects of the invention.

FIG. 3 illustrates a computing environment suitable for demonstrating one or more aspects of the instant disclosure. In particular, FIG. 3 demonstrates microphones 302(1)-302(2) and digital video cameras 308(1)-308(3) communicatively coupled to a sharing server 314. One or more of microphones 302(1)-302(2) and digital video cameras 308(1)-308(3) may include a wireless interface (e.g., a cellular data connection) for purposes of communicating with sharing server 314. Alternatively, one or more of microphones 302(1)-302(2) and digital video cameras 308(1)-308(3) may include a port, jack, or other connection module for purposes of communicatively coupling to sharing server 314 by way of one or more wired connections (and potentially via one or more intervening computing devices not shown in FIG. 3). Via the communication coupling between microphones 302(1)-302(2) and sharing server 314, microphones 302(1)-302(2) may transmit (audio) data to sharing server 314. Similarly, via the communication coupling between digital video cameras 308(1)-308(3) and sharing server 314, digital video cameras 308(1)-308(3) may transmit (audio and/or video) data to sharing server 314.

Each digital video camera and/or microphone may optionally be embedded as part of another device, e.g., a smartphone or mobile telephone, in a laptop computer or personal digital assistant, etc. Each recording device (e.g., a digital video camera) typically includes both audio and video recording capabilities. However, as described herein, one or more recording devices might only record audio.

Sharing server 314 may be communicatively coupled to client device 320. Client device 320 may receive the audio data and/or video data generated by microphones 302(1)-302(2) and digital video cameras 308(1)-308(3) via sharing server 314. Client device 320 may provide one or more inputs to allow a user of client device 320 to select audio data and video data from a particular source.

Microphones 302(1)-302(2) and digital video cameras 308(1)-308(3) may include location tracking equipment, such as global positioning system (GPS) equipment, to allow a location of microphones 302(1)-302(2) and digital video cameras 308(1)-308(3) to be determined. For example, microphones 302(1)-302(2) and digital video cameras 308(1)-308(3) may receive a signal from one or more tracking devices (a single tracking device 326, e.g., a satellite, is shown in FIG. 3) and a method, such as triangulation, may be performed at each of microphones 302(1)-302(2) and digital video cameras 308(1)-308(3) to determine their respective locations, e.g., using the global positioning system (GPS) or similar. The signals generated by the one or more tracking devices may be time coded to allow each microphone 302(1)-302(2) and digital video camera 308(1)-308(3) to generate a time stamp to synchronize to other signals or to be used as a basis of comparison for determining that data generated by one or more of microphones 302(1)-302(2) and digital video cameras 308(1)-308(3) corresponds to the same event both with respect to time as well as location. Microphones 302(1)-302(2) and digital video cameras 308(1)-308(3) may transmit their determined location information and/or time stamps to sharing server 314.

Sharing server 314 may use the location information provided by tracking device 326 to determine which microphones 302 and which digital video cameras 308 are being used to capture a particular event (or more specifically, which microphones 302 and digital video cameras 308 are in sufficiently close proximity to one another such that they are likely to be focused on a similar event). Sharing server 314 may also use the location information to transmit to client device 320 a map, a satellite image, a floor plan, or other graphical representation of an environment where microphones 302(1)-302(2) and digital video cameras 308(1)-308(3) are located. Client device 320 may display the graphical representation, thereby providing a user of client device 320 with an indication of the relative location of microphones 302(1)-302(2)

and digital video cameras 308(1)-308(3) with respect to an ongoing event. Accordingly, a consuming user's ability to adapt to changing circumstances in terms of being able to selectively choose a source of data may be enhanced based on the real-time information obtained regarding the location of microphones 302(1)-302(2) and digital video cameras 308(1)-308(3).

Returning to the earlier example regarding a politician delivering a victory speech, and supposing that the speech is delivered in a venue located in Chicago, Ill., a user of client device 320 located in Los Angeles, Calif. may elect to receive real-time audio data from microphone 302(1) (located in the Chicago venue) and real-time video data from digital video camera 308(1) (located in the Chicago venue) as the politician is approaching a podium. Thereafter, just as the politician begins to speak, the user of client device 320 may seamlessly switch the source of the data, e.g., such that client device 320 receives audio data from microphone 302(2) (located in the Chicago auditorium) and video data from digital video camera 308(2) (located in the Chicago auditorium). Just as the politician began to speak, the audio from microphone 302(1) and the video from digital video camera 308(1) may have degraded in quality (e.g., due to surrounding noise, someone stepping in front of video camera 308(2), etc.). As such, the user's (real-time) listening and viewing experience in Los Angeles, Calif. may be enhanced by virtue of her ability to switch the source of the audio data and the video data in the Chicago, Ill. auditorium, given that the multiple sources at least partly overlap in terms of their data capture period.

Figure 4:
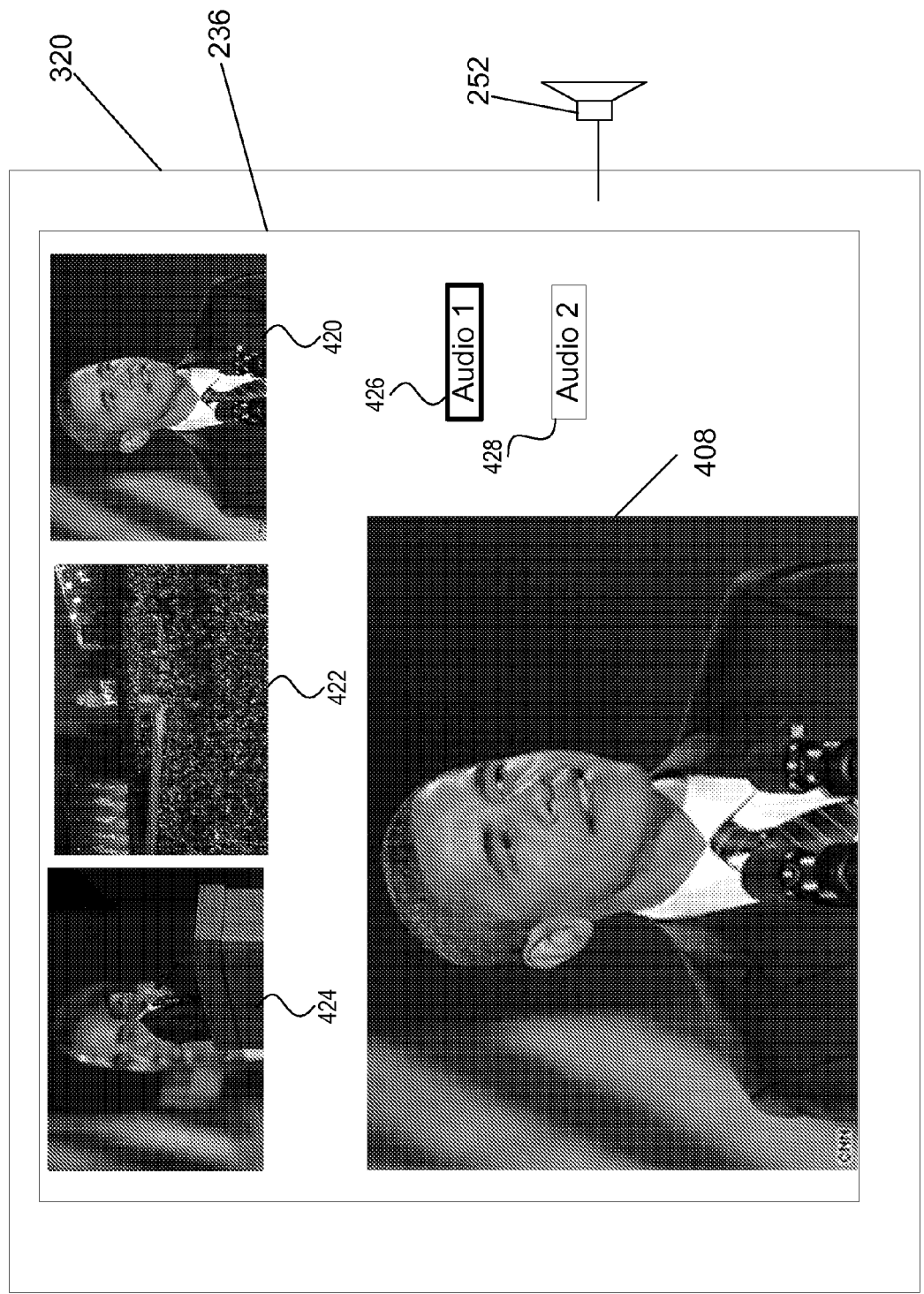
FIG. 4 illustrates a user interface suitable for demonstrating one or more example aspects of the invention.

In some embodiments, all of the source data (e.g., the audio data and the video data) may be presented to client device 320 as shown in the user interface illustrated in FIG. 4. FIG. 4 illustrates three video sources 420, 422, 424, and two additional audio sources 426, 428. Video 420 may correspond to media provided by camera 308(1); video 422 may correspond to media provided by camera 308(2); and video 424 may correspond to media provided by camera 308(3). Similarly, audio icon 426 may correspond to audio recorded by microphone 302(1), and audio icon 428 may correspond to audio recorded by microphone 302(2). If a user of client device 320 desires to primarily listen to audio data generated by source microphone 302(1) (icon 426) and the user desires to primarily view video data generated by source digital video camera 308(1) (video 420), the data from the primary sources may be played at a louder volume (as reflected by the bold outline on audio 426) on a speaker 252 or be displayed in a primary viewing area 408 of viewing display 236 at client device 320. The secondary audio data and video data generated by source microphone 302(2) and source digital video cameras 308(2)-308(3), respectively, may be presented at a lower volume (or muted) and consume a smaller proportion of viewing display 236 at client device 320, as illustrated in FIG. 4. The user may thereafter switch the primary sources to serve as secondary sources, and vice versa, by selecting each respective source with a mouse, stylus, touchscreen, or other user input. In some embodiments, if the number of sources exceeds the screen size or playback capabilities of client device 320, sharing server 314 may choose which audio data sources and/or video data sources to present to client device 320 for playback. The selection by sharing server 314 may take place based on geographic proximity, objective quality metrics, or other criteria.

In some embodiments, client device 320 accesses the source data (e.g., the audio data and the video data) after the respective event has been completed or accesses the source data during the event but in a time-shifted manner, such as having an approximately 5-minute lag. In these embodiments, a user may be provided a user interface on client device 320 and/or with any peripherals operationally connected to the client device that allows non-linear access to the source data. An end-user may, for example, be able to access the source data from desired arbitrary positions in terms of time relative to the beginning of the event, fast forward, fast rewind, and play certain parts of the source data multiple times.

Usage information related to the non-linear access to the source data may be transferred from client device 320 to sharing server 314, and a weighting as a function of time may be derived by sharing server 314 based on compiled statistics of non-linear access. For example, a weight for a certain time range can be equal to the number of end-users that viewed this time range. Consequently, those time ranges that are viewed more often may be assigned or allocated a greater weight. The playback rate may affect the weighting; for example, a smaller weight may be given to a time range if it was played in a faster rate of a real-time playback (i.e., in fast-forward-play mode). The time-based weighting may be used for deriving a summary version of the source data. For example, if the duration of the event is equal to ten (10) minutes and a one-minute summary should be derived from the event (e.g., as a response to a user request to have a one-minute summary), those pieces of the event that have the greatest weight and sum up to approximately one minute may be selected to generate the summary. In some embodiments, time ranges may be conditioned such that the generated summary is semantically continuous and complete. For example, in those embodiments a range may be precluded from starting or ending in the middle of a spoken word or sentence.

In some embodiments, client device 320 may pick specific interest points from the source data (e.g., the audio data and the video data). For example, an end-user may be able select a region of interest and possible zoom in on it. Furthermore, the region of interest area may comprise an object, which may be automatically followed (either by client device 320 or sharing server 314) and a zoomed-in version of the object may be provided on the user interface (e.g., display screen 236). An end-user may also be able to select a sound source from the auditory scene and amplify it relative to the other sound sources of the auditory scene. The presented types of region-of-interest selections and other similar ones may be implemented in client device 320 by processing the received source data or in sharing server 314 by processing the source data and transmitting a modified signal, such as audio and video data only comprising the region of interest, to client device 320. In both cases, the usage information related to the region of interest selection may be transferred from client device 320 to sharing server 314, and a weighting as a function of region of interest, a visible object, a sound source, or similar other functions/weightings can be derived by sharing server 314 based on the statistics of the region-of-interest selections. The region-of-interest-based weighting may be used for deriving a best-cut version and a summary version of the source data. For example, if the greatest amount of users followed a particular visual object within a certain time range (as a zoomed-in picture, cropping parts of the original source picture out), a zoomed-in version of this visual object within the particular time range may be selected into the best-cut and summary versions of the source data. The region-of-interest weighting may be used together with other types of weightings for the source data.

In some embodiments, client device 320 may be capable of displaying multiple views, e.g. stereoscopic video, or playing audio from multiple loudspeakers, such as stereo loudspeakers or using a 5.1 surround arrangement for loudspeakers. A best-cut or summary version may be derived for particular rendering capabilities of client devices 320. For example, different video sources may be selected for a single-view rendering device than for a stereoscopic rendering device.

In some embodiments, microphones 302(1)-302(2) and/or digital video cameras 308(1)-308(3) may be arranged to suit multi-view rendering on client device 320. For example, two digital video cameras may be jointly calibrated to point to the same direction with a particular distance between the cameras so that the video signals produced by the cameras can be directly rendered on a stereoscopic display. Microphones or digital video cameras may be arranged in a regular array. It is noted that the number of microphones and digital video cameras is not limited to those depicted in FIG. 3.

In addition to providing the audio, video, and location data to client device 320 in a passive manner as described above, sharing server 314 may take an active role in determining the source of the audio data and video data to use at any particular moment. For example, sharing server 314 may analyze the audio data and video data and switch the providing source of the data when a measured quality metric (e.g., volume, video clarity, etc.) falls below a threshold. Sharing server 314 may also implement one or more filtering or hysteresis algorithms in order to prevent excessively repetitive switching over a relatively short time period, which may help to ensure a smoothness or continuity in the data received at client device 320. In some embodiments, sharing server 314 may take on a hybrid active-passive role, actively providing recommendations to client device 320 as to which source(s) to use, but allowing (a user of) client device 320 to make the determination as to which source to use for the audio data and the video data.

In the preceding example related to the politician delivering a speech, the occurrence of the speech may have been preannounced and of a fixed duration. The content of the speech (or more specifically, the corresponding data) may have been delivered from the source devices (e.g., microphones 302 or digital video cameras 308) to sharing server 314 while the speech was being given (e.g., live or real-time), or may have been uploaded after the conclusion of the speech. Similarly, geo-tagging information may be delivered from the source devices while the speech was being given or uploaded after the conclusion of the speech. The geo-tagging information may be used to confirm that each recording is of the same event. The speech may be downloaded or streamed from sharing server 314 to client device 320. The downloading or streaming may be take place while the speech is given or may take place after the conclusion of the speech. In some embodiments, users of client devices 320 may manually enter or specify that one or more source devices (e.g., microphones 302 or digital video cameras 308) are used to record the same event. One or more of these techniques may result in a determination that each recording is of the same event.

In some embodiments, a microphone 302 or digital video camera 308 may be semi-permanently positioned to provide an ability to monitor an environment on demand. For example, when a woman is away from home and has placed the care of her young children with a babysitter, the woman may want to be able to "look-in" to see that the children are being taken care of. As such, the woman may situate one or more of microphones 302 and digital video cameras 308 within her home. When a microphone 302 or a digital video camera 308 is not being used as the source for audio data or video data (e.g., when the woman is not using a particular microphone 302 or a particular digital video camera 308 to look in on her children), sharing server 314 may command that the unused microphone 302 or digital video camera 308 power down (e.g., shut off), or enter a low power mode wherein the data may be recorded/stored at the source device but might not be transmitted to sharing server 314. In this manner, battery power can be saved at a microphone 302 or a digital video camera 308 when the respective device is not being used for purposes of sharing data with client device 320. Sharing server 314 may also engage in a command-response type of protocol with respect to the transmission of data from a microphone 302 or digital video camera 308 to sharing server 314 in order to make more judicious use of bandwidth.

In some embodiments, microphones 302 and/or digital video cameras 308 need not be human-operated and can be remotely controlled by client device 320. For example, client device may be able to turn selected microphones 302 and digital video cameras 308 to a desired direction or change their focus (zoom in or zoom out).

As described above, besides serving as a real-time conduit of audio and video data between microphones 302(1)-302(2), digital video cameras 308(1)-308(3), and client device 320, sharing server 314 may also record or save audio data and video data for later consumption. Thus, client device 320 may be able to receive or download audio data or video data from sharing server 314 after an event (e.g., delivery of a speech) has already taken place. The entirety of the data may be saved, or selected portions may be saved (e.g., pursuant to one or more compression techniques) in order to preserve storage space at sharing server 314.

Microphones 302(1)-302(2) and digital video cameras 308(1)-308(3) may provide the source signals or source data to sharing service 314 using one or more of file uploading, progressive uploading or streaming delivery methods. Client device 320 may obtain the audio and video data from sharing server 314 using one or more of file downloading, progressive downloading, or streaming delivery methods.

Sharing server 314 may compile statistics to be used to generate a "best-cut" or a summary version of the audio data and video data. For example, the computing environment of FIG. 3 shows a single client device 320 for purposes of simplicity in illustration, however, it is understood that in actual practice multiple client devices 320 may receive or download audio data and video data. Sharing server 314 may monitor which sources (e.g., which microphone 302 and which digital video camera 308) were selected by each of the multiple client devices 320 during playback of the event media. Sharing server 314 may generate a table or listing of statistics that references the selected source(s) at discrete moments of time during the playback of the event, based on which source(s) were selected by the most users at each point in time while watching the event. Thereafter, sharing server 314 may analyze the statistics and generate a master or summary media file based on the most popular source(s) at each point in time during the event.

All client device 320 selections may be accorded equal weight in generating the master media file, or in some embodiments, a particular client device 320's selections may receive additional weight. For example, if a particular client device 320 (or a user account associated with a user of a particular client device 320) has a history of making high-quality selections (e.g., the client device 320 has selected sources of audio data and video data that have been used at relatively high frequencies in master media files with respect to past events), that client device 320's selections may receive extra weight in generating the current master media file. Allocating weight to a particular client device 320's selections based on past high quality or successful selections may be useful in filtering out bogus or inferior selections, thereby ensuring a high-quality summary version.

In some embodiments, rather than simply selecting one of the sources (e.g., choosing microphone 302(1) over microphone 302(2)), the data generated by the various sources may itself be mixed or blended to form the "best-cut" or summary version. Thus, if an event lasts for sixty (60) seconds, audio from microphone 302(1) may be used for the first third of the event (e.g., from 0 to 20 seconds) in the summary version because more people chose to listen to audio from microphone 302(1) during that time duration. Similarly, audio from microphone 302(2) may be used for the second third of the event (e.g., from 20 to 40 seconds) in the summary version because more people chose to listen to audio from microphone 302(2) during that time duration. Audio from camera 308(3) may be used for the last third of the event (e.g., from 40 to 60 seconds) in the summary version because more people chose to listen to audio from camera 308(3) during that time duration. Similarly, the video sources may be mixed or blended to form the summary version in relation to video footage, e.g., video from camera 308(1) may be used from 0 to 5 seconds, video from camera 308(2) may be used from 5 to 50 seconds, and video from camera 308(3) may be used from 50 to 60 seconds. The time periods chosen in this example are arbitrary, and it is understood that different time periods may be used based on the popularity of media originating from a source device at a given instant in time.

In some embodiments, weighting may be provided to a particular client device's 320 selections when performing mixing. For example, as described above, a particular client device 320 that has a history of selecting high quality perspectives may be given additional weight relative to the other client devices 320 when the mixing is performed. Alternatively, or additionally, the mixing or blending may be performed as a function of distance and direction of a source device relative to an event. For example, a selection by a client device 320 corresponding to a source device that is located closer to an event may receive additional weight relative to a selection corresponding to a source device that is further from the same event.

The computing environment of FIG. 3 is merely illustrative, and it is understood that modifications may be made without departing from the scope and spirit of the instant disclosure. For example, in some embodiments a collection of sharing servers 314 may be used instead of a single sharing server 314. Thus, in some embodiments a first sharing server 314 may be used to receive audio data from microphones 302 and a second sharing server 314 may be used to receive video data from digital video cameras 308. Alternatively, each sharing server may host and/or serve data from or to a particular geographic region.

In some embodiments, sharing server 314 resides in the same device as a microphone 302 and/or a digital video camera 308.

In some embodiments, the storage of streams or files may be distributed to many devices even in the case of a same or similar event. Each of these devices may be client devices 320 themselves and act as a server for other client devices 320. In other words, the streams or files may be distributed in a peer-to-peer manner.

In some embodiments, sharing server 314 may be functionally divided into a collection of servers or service systems, which may, but need not be, performed in a single device. In one embodiment, sharing server 314 is functionally divided into a production and broadcast service system, an automated best-cut service system, and a unicast streaming server. The production and broadcast service system takes input from microphones 302 and digital video cameras 308, which may be professional equipment. Furthermore, the production and broadcast service system may include automated and manual editing of the input from the microphones and cameras. As a result, more than one audio or audiovisual stream is multicast or broadcast to client devices 320 for example using a digital television network. A formula race with more than simultaneously broadcast camera view out of which end-users can select their preferred one is an example of a production and broadcast service. The production and broadcast service system need not be different from those used conventionally for multiple camera view broadcasts. An automated best-cut service system may collect the information from client devices 320 which microphones and digital video cameras were chosen to be rendered in client devices 320 (as a function of time). The information may be transmitted from client device 320 to the automated best-cut service system through a different network than the one through which audiovisual streams are transmitted to client device 320. The automated best-cut service system may form a mixed or blended "best-cut" or summary version of an event broadcast based on the selection information received from client devices 320. The best-cut or summary version of an event broadcast may be accessed by client devices 320 through another type of a network and network connection than what was used to connect the production and broadcast service system and client devices 320. Unicast streaming may be used to access a best-cut version of an event broadcast.

Figure 5:
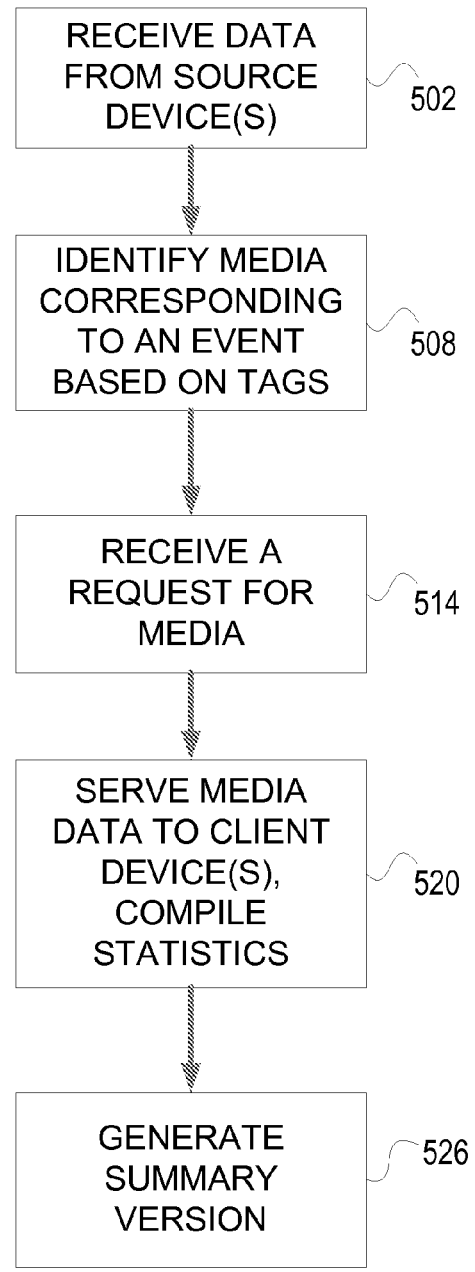
FIG. 5 illustrates a method suitable for demonstrating a generation of a summary media stream in accordance with one or more example aspects of the invention.

FIG. 5 illustrates a method suitable for demonstrating one or more aspects of the instant disclosure. The method illustrated in FIG. 5 may be applied to the computing environment of FIG. 3 as described below. In particular, the steps of the method of FIG. 5 are shown with respect to sharing server 314 of FIG. 3, however, it is understood that the method could have been illustrated with respect to the other devices/entities shown in FIG. 3. Moreover, the method may be adapted to accommodate modifications to the computing environment of FIG. 3 without departing from the scope and spirit of the instant disclosure.

In step 502, sharing server 314 may receive data from one or more source or capturing devices. For example, in relation to the computing environment of FIG. 3, sharing server 314 may receive audio data and/or video data from one or more of microphones 302(1)-302(2) and/or digital video cameras 308(1)-308(3). The received data may be geo-tagged with time and location information in order to allow identification of a similar event as described herein. The data received from a given source device may also be tagged with a source identification (ID) to distinguish the source device (or user) from another source device (or user). Sharing server 314 may save (all or a portion of) the received data to facilitate subsequent playback via a download operation as described above.

In step 508, sharing server 314 may identify media corresponding to an event based on the geo-tagged data received in step 502. More specifically, sharing server 314 may compare the geo-tag time and location information to confirm that data received from a first source device and data received from a second source device both correspond to the same event.

In step 514, sharing server 314 may receive a request for media corresponding to an event from one or more client devices 320. For example, a user of a client device 320 may choose a desired event, or may provide an approximate time and geographical location in a menu (or other interface) on client device 320, and those selections may be transmitted to sharing server 314. The selection performed by the user of the client device 320 may also include a selection of a source device that the user desires to receive media from. For example, once a user of a client device 320 identifies an approximate time and geographical location, sharing server 314 may transmit to the client device 320 a graphical representation (e.g., a map) of the one or more source devices that are or were in use, and the user may perform a selection with respect to the available source devices, e.g., by choosing a source device ID.

In step 520, sharing server 314 may compare the time and geographical location selections received from client device 320 in step 514 (and the source device selections, if provided by the user of the client device 320) to the table or listing maintained at sharing server 314 as described above with respect to step 508 in order to identify an event, if no event was identified by the user. Based on the identified event, sharing server 314 may serve media data corresponding to the identified event to the requesting client device(s) 320. Sharing server 314 may monitor which media source device(s) are selected over time by one or more client devices 320, and may compile statistics regarding which sources were selected most often at each point in time during the event. The statistics may be used to generate a "best-cut" or summary version of the media data as described below with respect to step 526.

In step 526, sharing server 314 may compile a "best-cut" or summary version of the media data based on statistics compiled in relation to one or more client device 320 selections of source devices. Step 526 may occur automatically, manually, or based on some predefined condition and/or user input. In some embodiments, a minimum amount of statistics may be required before a "best-cut" or summary version is generated. For example, source selections from at least one hundred client devices 320 may be required. Other minimum threshold criteria may be used. The best-cut version may be compiled by selecting, at each point in time, the source video and/or audio that was selected by the most users reviewing the event media. Hysteresis may be used to avoid excessive switching between video and audio sources, in order to ensure smoothness or continuity of media received at a client device 320.

The method shown in FIG. 5 may repeat or loop on itself, in whole or in part, in order to facilitate continuously receiving data from the source devices and to continue to receive selections from the client devices.

The method of FIG. 5 is merely illustrative. In some embodiments, some of the steps may be made optional. Additionally, in some embodiments, additional steps may be included that are not shown. For example, sharing server 314 may issue one or more commands or directives to source devices to control the source devices (e.g., to direct the source devices to transmit media data, to order the source devices to enter a low power mode as described above, etc.). Furthermore, in some embodiments the steps of the method of FIG. 5 may be rearranged.

As described above, sharing server 314 may simply act as a passive pass-through device such that the data received from the source devices in step 502 is simply passed on to the one or more client devices 320. In other embodiments, sharing server 314 may transform or otherwise manipulate the data so as to present the data in a preferred format at a client device 320. For example, if a client device 320 that is an intended recipient of video data has a relatively slow processing unit, sharing server 314 may strip out or remove video data via one or more compression techniques, thereby easing the processing load on the client device 320.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, at an apparatus, first media data from a first source device and second media data from a second source device;
determining, at the apparatus, that the first media data and the second media data represent an event;
receiving, at the apparatus, from a client device a request for media related to the event;
causing, at least in part by the apparatus, transmission of the first media data to the client device responsive to the received request;
receiving, at the apparatus, from the client device a user input indicating a desired change from the first source device to the second source device during playback of the first media data;
causing, at least in part by the apparatus, transmission of the second media data to the client device responsive to the user input;
receiving, at the apparatus, a selection from the client device choosing one of the first source device and the second source device over a duration of the event;
receiving, at the apparatus, a selection from a second client device choosing one of the first source device and the second source device over the duration of the event;
compiling, at the apparatus, statistics related to the received selections from the client device and the second client device over the duration of the event, wherein the compiled statistics include zooming in by one or more users for an object captured in one or more portions of the received selections;
remotely controlling, by the apparatus without user intervention, one or more microphones, one or more cameras, or a combination thereof, to capture one or more zoomed-in versions of the object; and
generating, by the apparatus, a summary version of media data following the object based on the portions, wherein the summary version of media data includes the one or more zoomed-in versions of the object.

2. The method of claim 1, wherein the determining that the first media data and the second media data represent the event comprises comparing geo-tag information included with each of the first media data and the second media data to associate each of the first media data and the second media data with the event, and wherein the apparatus is embedded in the client device.

3. The method of claim 1, wherein the first source device is a mobile terminal comprising a video camera, and the video camera is remotely controlled to capture one or more of the zoomed-in versions of the object.

4. The method of claim 1, further comprising:
determining that the compiled statistics indicate that the first source device is more popular than the second source device over a discrete period of time,
wherein the summary version of media data over the discrete period of time is based on the first media data from the first source device responsive to the determination that the compiled statistics indicate that the first source device is more popular than the second source device over the discrete period of time.

5. The method of claim 1, wherein the compiling of statistics related to the received selections from the client device and the second client device over the duration of the event comprises determining that at least one of the client device and the second client device accesses at least one of the first media data and the second media data on a non-linear basis.

6. The method of claim 1, wherein the at least one of the transmitting of the first media data and the transmitting of the second media data to the client device occurs via streaming delivery.

7. The method of claim 1, further comprising:
receiving from the client device a selection associated with a region of interest; and
generating another summary version of media data based on the selected region of interest.

8. The method of claim 1, further comprising:
determining a rendering capability of the client device; and
generating another summary version of media data based on the determined rendering capability.

9. The method of claim 1, wherein the first media data is video data and the second media data is audio data, and the method further comprising:
applying hysteresis to the portions to limit switching between video data portions and audio data portions of the portions.

10. The method of claim 1, wherein the compiled statistics include playback speeds of portions of the received selections, and the method further comprising:
assigning weightings to the portions in reverse proportion to the playback speeds, wherein the summary version of media data is generated further based on the weightings.

11. The method of claim 1, wherein the summary version of media data is provided after the event ends and is of a duration that is less than the duration of the event.

12. A non-transitory computer readable medium having stored thereon computer executable instructions that, when executed, cause an apparatus to perform:
receiving first media data from a first source device and second media data from a second source device;
determining that the first media data and the second media data represent an event;
receiving from a client device a request for media related to the event;
causing, at least in part, transmission of the first media data to the client device responsive to the received request;
receiving from the client device a user input indicating a desired change from the first source device to the second source device during playback of the first media data;
causing, at least in part, transmission of the second media data to the client device responsive to the user input;
receiving a selection from the client device choosing one of the first source device and the second source device over a duration of the event;
receiving a selection from a second client device choosing one of the first source device and the second source device over the duration of the event;
compiling statistics related to the received selections from the client device and the second client device over the duration of the event, wherein the compiled statistics include zooming in by one or more users for an object captured in one or more portions of the received selections;
remotely controlling, without user intervention, one or more microphones, one or more cameras, or a combination thereof, to capture one or more zoomed-in versions of the object; and
generating a summary version of media data following the object based on the portions, wherein the summary version of media data includes the one or more zoomed-in versions of the object.

13. The non-transitory computer readable medium of claim 12, wherein the computer executable instructions further cause the apparatus to perform:
receiving from the client device a user input indicating that the first media data and the second media data represent the event,
wherein the determination that the first media data and the second media data represent an event is based on the received user input indicating that the first media data and the second media data represent the event, and
wherein the apparatus is embedded in the client device.

14. The non-transitory computer readable medium of claim 12, wherein the computer executable instructions further cause the apparatus to perform:
determining that the compiled statistics indicate that the first source device is more popular than the second source device over a discrete period of time; and
generating another summary version of media data over the discrete period of time based on the first media data from the first source device responsive to the determination that the compiled statistics indicate that the first source device is more popular than the second source device over the discrete period of time.

15. An apparatus comprising:
a processor; and
at least one memory including computer program code for one or more programs,
the at least one memory and the computer program code configured to, with the at least one processor, cause the apparatus to perform at least the following,
cause, at least in part, transmission of media data related to an event to a plurality of client devices;
receive at least one selection from one or more of the plurality of client devices over the duration of the event, the at least one selection identifying a preferred source of the media data at discrete points in time during playback of the media data;
compile statistics related to the received selections from the client device and the second client device over the duration of the event, wherein the compiled statistics include zooming in by one or more users for an object captured in one or more portions of the received selections;
remotely control, without user intervention, one or more microphones, one or more cameras, or a combination thereof, to capture one or more zoomed-in versions of the object; and
generate a summary version of media data following the object based on the portions, wherein the summary version of media data includes the one or more zoomed-in versions of the object.

16. The apparatus of claim 15, wherein the computer executable instructions further cause the apparatus to perform:
determine that the compiled statistics indicate that media data originating from a first source device is more popular than media data originating from a second source device over a discrete period of time included in the duration of the event; and
generating another summary version of media data over the discrete period of time is based on the media data originating from the first source device responsive to the determination that the compiled statistics indicate that the media data originating from the first source device is more popular than the media data originating from the second source device over the discrete period of time, and
wherein the apparatus is embedded in the client device.

17. The apparatus of claim 15, wherein the summary version of media data is a mix of first media data originating from a first source device and second media data originating from a second source device.

18. The apparatus of claim 16, wherein the another summary version of media data is generated by selecting media data, at each discrete point in time, originating from a source device that was selected by the most client devices.

\* \* \* \* \*